United States Patent [19]
Gee et al.

[11] 3,876,927
[45] Apr. 8, 1975

[54] MAGNETIC SENSOR WITH SHORTED TURN

[75] Inventors: Gordon E. Gee; Frank J. Blakeley, both of Sarasota, Fla.

[73] Assignee: Electro Corporation, Sarasota, Fla.

[22] Filed: Dec. 20, 1973

[21] Appl. No.: 426,451

[52] U.S. Cl................ 324/34 D; 310/155; 323/85; 336/73
[51] Int. Cl............................................ G01r 33/00
[58] Field of Search.. 324/34 R, 34 B, 34 D, 34 GT, 324/173, 174; 336/84, 110, 73; 323/50, 85, 92; 335/245; 310/155, 168, 194

[56] References Cited
UNITED STATES PATENTS

| | | | |
|---|---|---|---|
| 2,662,996 | 12/1953 | Martin | 324/174 |
| 2,999,295 | 9/1961 | Manning et al. | 324/174 |
| 3,252,024 | 5/1966 | Loudon | 324/174 |
| 3,380,008 | 4/1968 | Lunt et al. | 323/50 |

*Primary Examiner*—Robert J. Corcoran
*Attorney, Agent, or Firm*—Wegner, Stellman, McCord, Wiles & Wood

[57] ABSTRACT

A magnetic pickup for sensing movement of a body of magnetic material. The pickup includes a coil having a shorted turn to limit the amplitude of the output signal which would otherwise occur at high movement rates. The pickup has a pole piece extending through the coil, with a conductive sleeve surrounding the pole piece. Limitation of the output signal amplitude enables use of the sensor in an explosive environment. The conductive sleeve also reduces the susceptibility of the sensor to interference from stray fields.

14 Claims, 7 Drawing Figures

3,876,927

FIG. 3
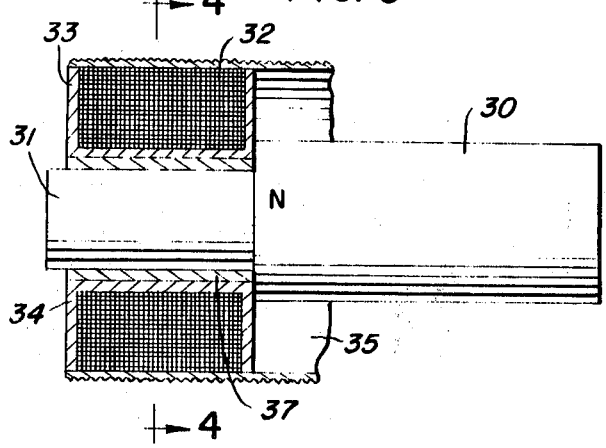
FIG. 4
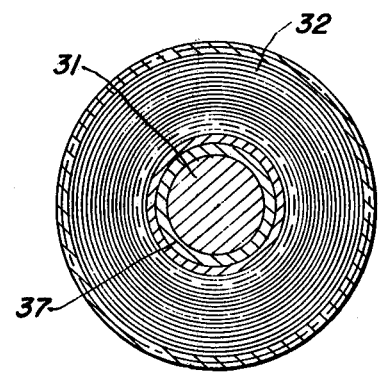
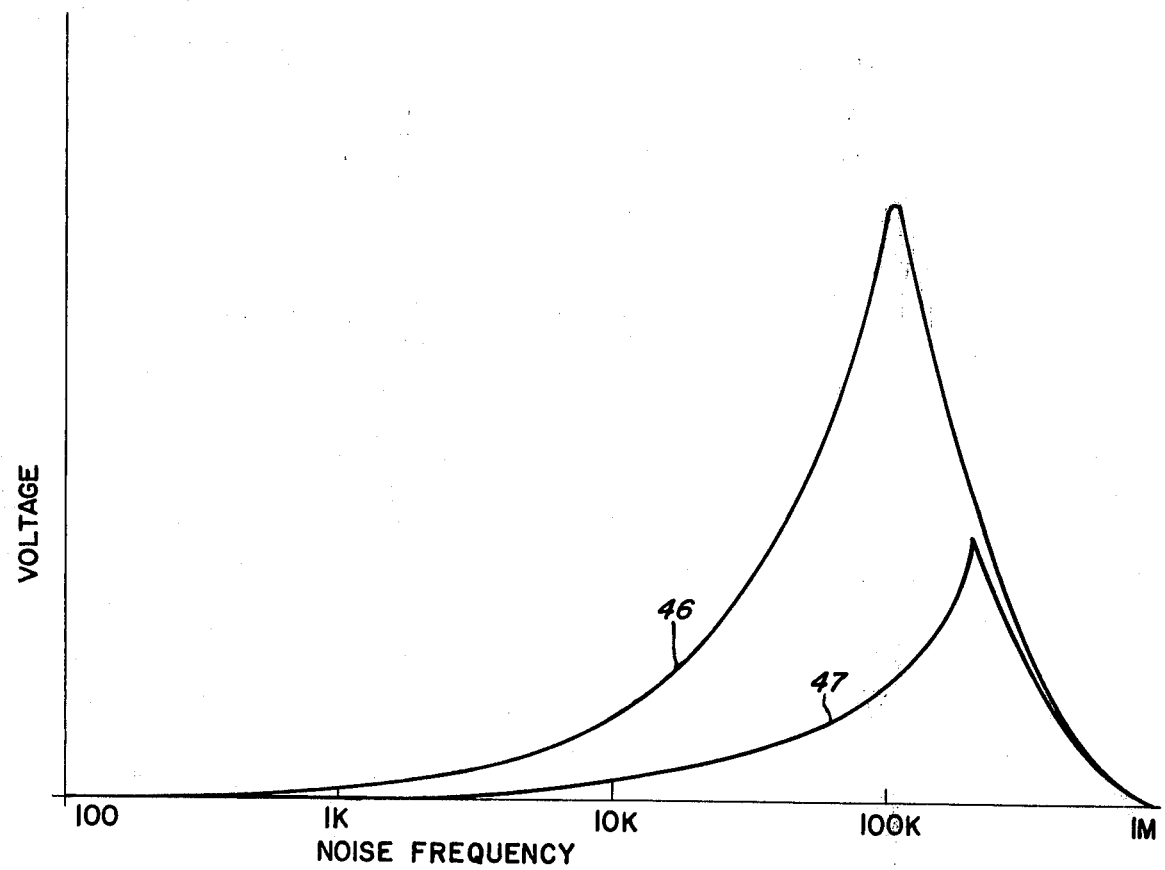
FIG. 7

MAGNETIC SENSOR WITH SHORTED TURN

BACKGROUND OF THE INVENTION

Magnetic sensors or pickups have been used for at least thrity years to develop an electric signal in accordance with the relative motion between the sensor and a body of magnetic material. A common form of magnetic sensor comprises a permanent magnet with a pole piece and a coil around the pole piece. If a body of magnetic material moves in the field from the pole piece, the reluctance of the magnetic path changes and there is a change in the flux linking the coil, inducing a signal across the coil terminals.

An important use for such a sensor is in the measurement of the speed of a rotating element. In a typical system a spur gear is mounted on the rotating element and the magnetic pickup is located adjacent the path of the gear teeth. As the teeth pass the pole piece of the pickup, the flux through the coil changes, inducing a signal in the coil. Both the frequency and the amplitude of the coil signal vary linearly as a function of speed. In the usual system the frequency of the coil signal is utilized to develop a speed related control or output signal. The amplitude of the coil signal is generally of little significance so long as it exceeds the noise level sufficiently to enable accurate detection of the frequency.

In some situations, it is desirable to operate a magnetic sensor in an explosive environment. For safety the coil signal amplitude must be limited so that a spark which might ignite the atmosphere will not occur in the event of a sensor failure, as the occurrence of an open circuit in the coil or other portion of the circuitry. Prior attempts to limit the signal amplitude have utilized semiconductors connected across the coil which clamp the output voltage at a low level. This approach adds significantly to the cost of the sensor. Furthermore, if one of the semiconductor components or its connection to the coil circuit should fail, the safety feature is ineffective. In addition, clipping of the coil signal introduces harmonic distortion which may cause erroneous speed measurements.

We have found that a low resistance shorted turn on the magnetic sensor coil reduces the rate of increase of the signal voltage as a function of the speed of the motion being sensed. Because of the loading effect of the shorted turn, the signal voltage across the coil, even at high sensing speeds, is not so great as to be dangerous in an explosive atmosphere.

One feature of the invention is the provision of a magnetic pickup with a shorted electrical turn on the coil.

Another feature is that the shorted turn is within the coil, and more specifically is a tube of conductive material surrounding the core which extends through the coil.

A further feature is that the core and the biasing magnet of the pickup serve as a heat sink to dissipate the heat developed in the shorted turn.

An additional feature of the invention is that the shorted turn reduces sensitivity of the coil to interference.

Further features and advantages of the invention will readily be apparent from the following specification and from the drawings, in which:

FIG. 3 is an axial section of a pickup embodying the invention;

FIG. 4 is a transverse section taken generally along the line 4—4 of FIG. 3;

FIG. 7 is a plot of curves comparing the performance of a prior art pickup with that of one embodying the invention for susceptibility to interference, as a function of frequency.

Figure 1:
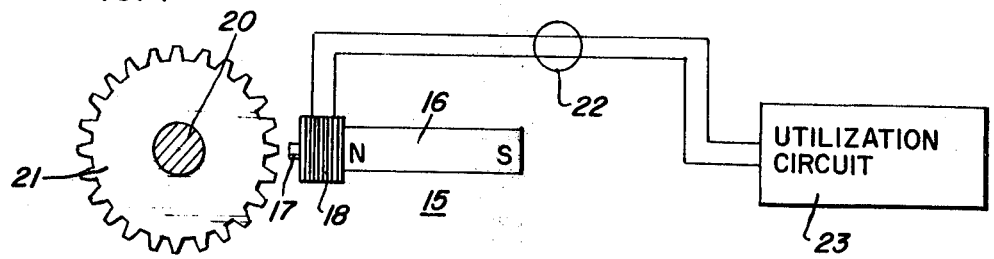
FIG. 1 is a diagrammatic illustration of a magnetic pickup used to measure the speed of a rotating part.

A magnetic sensor 15 is illustrated in FIG. 1 in a typical speed measuring system. The sensor includes a permanent magnet 16, a pole piece 17 and a coil 18 through which the pole piece extends. Sensor 15 is utilized to measure the rotational speed of shaft 20 on which a gear 21 is mounted. The end of pole piece 17 is positioned adjacent the path of the ends of the teeth of gear 21. Movement of the gear teeth past the pole piece changes the reluctance of the magnetic path for the flux from magnet 16, causing a change in the flux linkage of coil 18. The flux change induces a voltage across the coil which is connected through leads 22 with a suitable utilization circuit 23. Examples of utilization circuits are found in Gee U.S. Pat. No. 3,721,968 and Moss et al U.S. Pat. No. 3,560,854. The Moss patent is illustrative of a circuit which is responsive to the frequency of the coil signal to provide a speed indication and speed related function control signals.

The signal developed in sensor coil 18 responsive to the teeth of a rotating gear is, except for very slow speeds, a cyclically varying signal approximating a sine wave. The frequency of the signal is determined by the rate at which the gear teeth pass the pole piece 17 of the sensor. The voltage of the signal induced across the coil is given by the expression $$e = N(d\phi/dt)$$

where $e$ is the induced voltage

N is the number of turns in the coil $d\phi/dt$ is the rate of change of flux with time.

Figure 2:
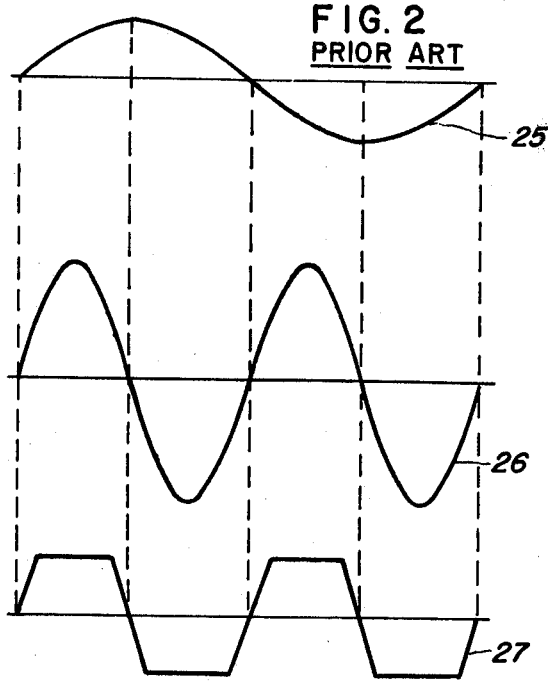
FIG. 2 is a set of curves illustrating the signals derived from a prior art magnetic pickup under different conditions of speed and circuit configuration.

Curves 25 and 26, FIG. 2, illustrate the relationship of the coil signal as the speed changes. Curve 26 is for a frequency twice that of curve 25 and the peak voltage of curve 26 is twice that of curve 25. Curve 27 illustrates the wave form for the same speed as curve 26 where the coil voltage is clipped to limit the signal amplitude. The nonsinusoidal wave shape includes significant energy at harmonic frequencies of the fundamental. The utilization circuit 23, unless carefully designed to reject harmonics, may provide erroneous outputs with a clipped input signal.

A magnetic sensor incorporating the invention is illustrated in FIGS. 3 and 4. Permanent magnet 30 is magnetized axially and has mounted on one end thereof a pole piece 31, which is a cylindrical body of low reluctance magnetic material. Coil 32 is wound on a bobbin 33 which has a spool-like configuration with spaced end walls between which the coil is located and a central opening 34. Pole piece 31 extends from the end of magnet 30 through the central opening 34 of the bobbin and the bobbin rests against the end of the magnet. An outer shell or casing 35 encloses the coil and magnet and the assembly may be sealed in a body of insulating material.

In accordance with the invention a conductive sleeve 37 surrounds pole piece 31 inside the inner wall of bobbin 33, forming a low resistance shorted turn with respect to the coil. Copper has been found to be a suitable material for the sleeve.

Figure 5:
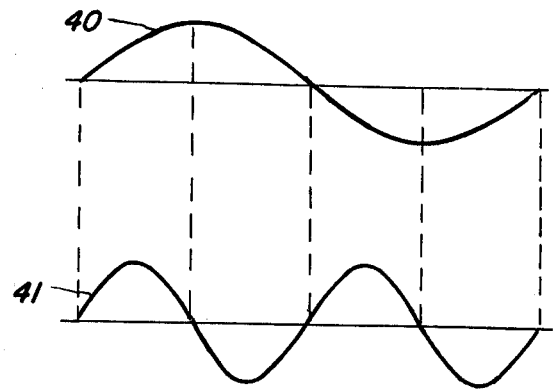
FIG. 5 is a set of curves representing the output voltage of a sensor embodying the invention with different speeds.
Figure 6:
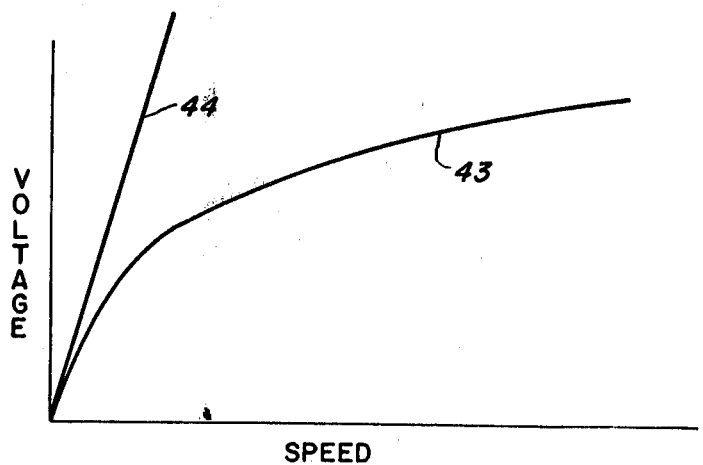
FIG. 6 is a plot of coil voltage as a function of speed for a prior art magnetic sensor and a sensor embodying the invention.

The shorted turn loads coil 32, absorbing energy which would otherwise be utilized in generating an increased voltage across the coil as the speed of the part being sensed and the rate of change of flux with time increase. As a result, the output voltage from the coil is essentially constant with speed. This is illustrated in FIGS. 5 and 6. Curve 40 is comparable with curve 25 of FIG. 2, showing the output of the coil at a first speed. When the speed is doubled, the output curve 41 has a frequency which is doubled but an amplitude that is essentially the same.

In FIG. 6 the voltage output of the sensor with a shorted turn, as a function of speed, is indicated by curve 43. At low speeds the voltage increases relatively rapidly while at higher speeds the voltage increase is much less. The voltage/speed relationship for a prior art magnetic sensor is indicated by curve 44 where the voltage increases linearly as a function of speed.

The shorted turn is preferably located inside the coil and in physical contact with the pole piece. With this construction, heat generated by circulating currents in the shorted turn is transmitted by conduction to the pole piece 31 and to magnet 30 through which it is dissipated. This helps avoid excessive temperatures in the coil itself.

It has been found that the addition of the shorted turn reduces the sensitivity of the pickup to interference. In FIG. 7 the no-load coil voltage is plotted as a function of the frequency of a radiated signal to which the pickup is exposed. A prior art magnetic pickup, curve 46, is self-resonant at about 100 kilocycles. A comparable pickup with a shorted turn is self-resonant at 200 kilocycles. Furthermore, the voltage at resonance is only about half that of the prior art pickup.

We claim:

1. A magnetic sensor for sensing the movement of a body of magnetic material comprising:
   a permanent magnet;
   a pole piece of magnetic material extending from said magnet;
   a coil around said pole piece, the magnetic flux through said pole piece linking said coil and being subject to a change in magnitude upon relative movement between the sensor and said body of magnetic material in the field extending from the pole piece, inducing a voltage in said coil; and
   a shorted turn operably associated with said coil, said turn designed to substantially reduce the rate of increase of signal voltage induced in said coils as a function of the speed of the body being sensed and thereby appreciably limiting the amplitude of the voltage induced in the coil.

2. The magnetic sensor of claim 1 in which said shorted turn is a conductive sleeve coaxial with said coil.

3. The magnetic sensor of claim 2 in which said conductive sleeve is located between the coil and said pole piece.

4. The magnetic sensor of claim 3 in which said conductive sleeve is in physical contact with the pole piece.

5. The magnetic sensor of claim 4 wherein said permanent magnet has an end portion, said pole piece is cylindrical and extends from said end portion, and has a cross sectional dimension less than that of the magnet, said coil is wound on a bobbin having an axial opening through which said pole piece extends, and said conductive sleeve surrounds said pole piece, inside the axial opening of said bobbin and in physical contact with said pole piece, whereby heat generated in said sleeve is at least in part dissipated in said pole piece and magnet.

6. The magnetic sensor of claim 2 in which said conductive sleeve is of a material having a conduction characteristic of the order of that of copper.

7. In a magnetic sensor having a magnet, a pole piece and a coil around said pole piece subject to a change in the magnitude of a magnetic flux from the magnet linking the turns of the coil, upon relative movement to be sensed between the coil and a body of magnetic material, the improvement comprising:
   a cylindrical sleeve defining a shorted turn around said polepiece having an outside diameter less than that of the coil, said sleeve being made from a material with a conductivity on the order of that of copper and designed to substantially reduce the rate of increase of signal voltage induced in said coil as a function of the speed of the body being sensed and thereby limiting the amplitude of the voltage in the coil.

8. The magnetic sensor of claim 7 in which said cylindrical sleeve is inside said coil.

9. In a magnetic sensor having a magnet and a coil within which a signal is induced in response to the time rate of change of flux from the magnet linking the coil, the improvement comprising:
   a shorted turn operatively associated with said coil such that it is linked by flux linking said coil, said shorted turn having a loop resistance sufficiently low to render substantially nonlinear the relationship between the time rate of change of flux and the amplitude of the signal induced thereby, said amplitude increasing with the time rate of change of flux less rapidly at faster rates of flux change than at slower rates of flux change.

10. The magnetic sensor of claim 9 in which said shorted turn is a single turn.

11. The magnetic sensor of claim 10 in which said shorted turn is a cylindrical sleeve of conductive material.

12. The magnetic sensor of claim 11 in which said sleeve is copper.

13. The magnetic sensor of claim 9 having a core inside said coil and forming a pole piece for the sensor, said shorted turn being between said coil and said core.

14. The magnetic sensor of claim 9 in which said shorted turn is made from a material having a resistivity on the order of that of copper.

* * * * *